Oct. 30, 1923.  1,472,304

W. B. MICHEL

AUTOMOBILE PANEL CONSTRUCTION

Filed Feb. 9, 1922

Inventor:
Wm. B. Michel.
By Milo B. Stevens
Attorneys

Patented Oct. 30, 1923.

1,472,304

UNITED STATES PATENT OFFICE.

WILLIAM B. MICHEL, OF PLYMOUTH, INDIANA.

AUTOMOBILE PANEL CONSTRUCTION.

Application filed February 9, 1922. Serial No. 535,237.

*To all whom it may concern:*

Be it known that I, WILLIAM B. MICHEL, a citizen of the United States, residing at Plymouth, in the county of Marshall and State of Indiana, have invented new and useful Improvements in Automobile Panel Constructions, of which the following is a specification.

My invention relates to automobile panels and more particularly to panels adapted to close the space between the windshield and the side curtains of the car.

An important object of the invention is to provide a windowed panel of the above mentioned character whereby the driver of the car may obtain a full and complete outlook to either side irrespective of the weather condition.

A further object of the invention is to provide a novel and improved means for removably securing the panel in position.

A still further object of the invention is to furnish a panel of the above mentioned character which is neat and attractive in appearance, highly efficient in use and which may be adapted to all types of cars without modification of the standard equipment thereon.

With these and other objects in view, the invention comprises a novel combination and arrangement of parts to be hereinafter described and claimed and in order that the same may be better understood, reference is had to the accompanying drawing forming a part of this specification and in which the preferred embodiment of the invention is disclosed.

Figure 1:
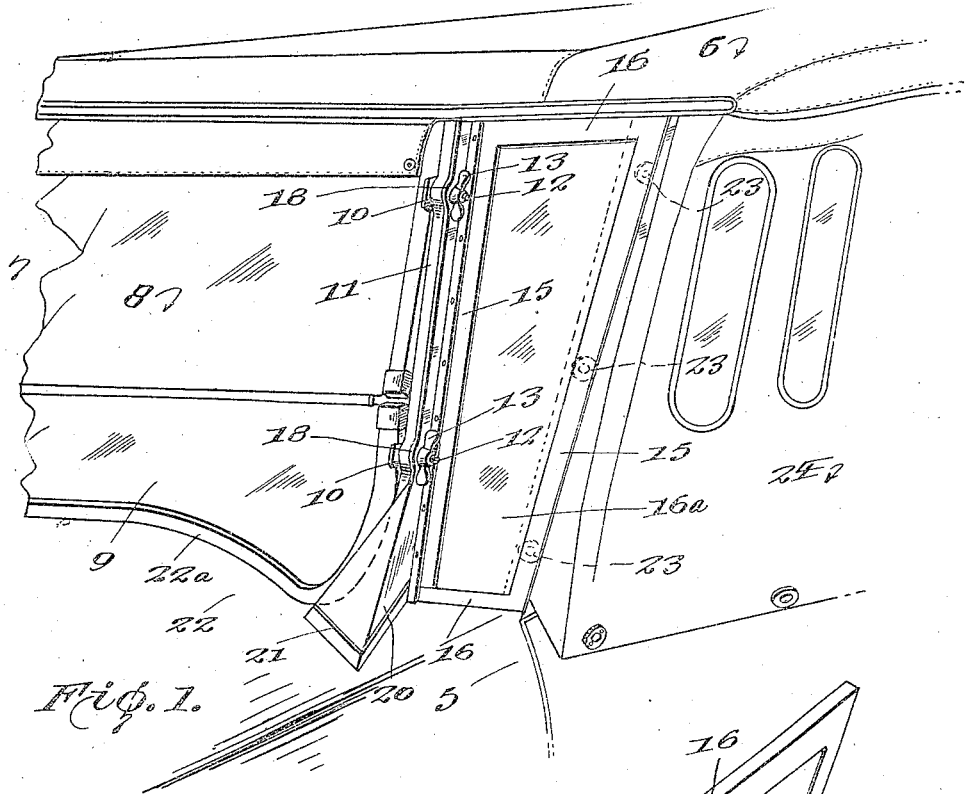
Figure 1 is a perspective view of a portion of the front quarter of an automobile showing my panel in position.
Figures 2, 3:
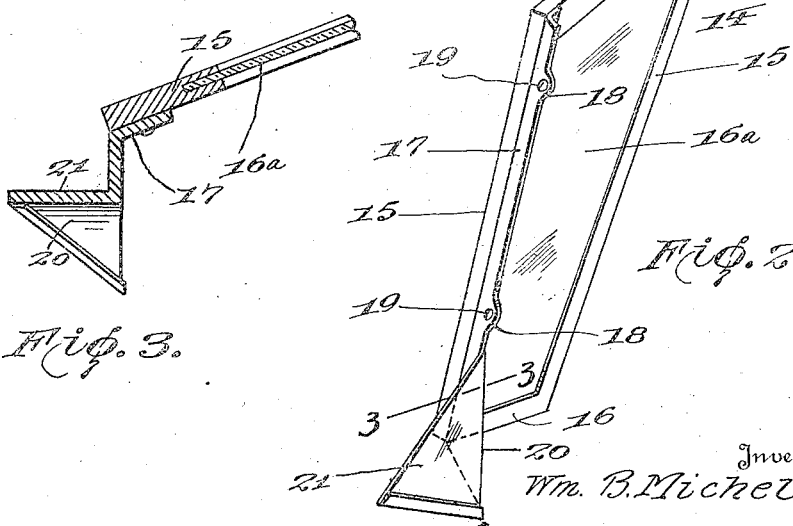
Fig. 2 is a perspective view of the panel removed.
Fig. 3 is an enlarged section on the line 3—3 of Fig. 2.

Referring specifically to the drawing, wherein like characters of reference designate like parts throughout the several views, 5 designates an automobile having a top 6 and a windshield 7, comprising sections 8 and 9 which are pivotally secured in bearings 10 of the windshield brackets 11 in the usual manner by means of bolts 12 and adjusting nuts 13.

Numeral 14 denotes my improved panel having a rigid frame comprising side and end walls 15 and 16 respectively, and carrying the window pane 16ª. The frame is preferably made of steel and in the drawing, I have illustrated it as being flat. However, if desired it may be made slightly curved in cross-section to present a more pronounced bay-window effect between the windshield and the front doors. The panel is adapted to close the space between the windshield and the door curtains of the car and replace the curtains now used for that purpose. To one of the panel side walls 15 there is rigidly secured a lateral flange 17, having two enlargements 18, to conform to the pivot bearings 10 of the windshield brackets 11, and also having apertures 19 extending through each of said enlargements 18 to receive the bolts 12. The bolts 12 having been passed through the apertures 19, it will be readily seen that the adjusting nuts 13 may be screwed in place and firmly hold the panel in position. The flange 17 may be bent to form the necessary angle to bring the outer wall 15 into proper position adjacent the front door of the car.

The lower portion of the flange 17 is formed with a preferably integral apron 20 which extends forwardly to clear the base of the windshield frame and then inwardly at 21 to close the space between the windshield and its frame as best shown in Fig. 1. The inward bend 21 of said apron lies flush against the hood 22 of the car and against the bottom edge 22ª of the windshield frame thus effectually shutting off the entry of wind and water and promoting the comfort of the occupants of the car.

The bottom wall 16 of the panel may be fastened to the wall section of the car by means of screws or in any other approved manner if such fastening is found desirable. Standard buttons 23 are carried by the free side wall 15 of the panel to which may be fastened the adjacent edge of the door curtain 24.

From the foregoing description taken in connection with the accompanying drawing, it will be readily seen that I have furnished a neat and attractive panel which will greatly facilitate the driving of automobiles in cold and inclement weather and contribute materially to the safety and comfort of the occupants. While I have described the preferred embodiment of my invention it will be understood that the same is capable of various changes and modifications within the spirit and scope of the appended claims.

I claim:

1. A storm shield for motor vehicles comprising a rigid glazed frame having a heighth to extend between the body and the top of the vehicle, a flange outstanding from the forward vertical edge of the frame, and means associated with said flange for attachment thereof to the end of the vehicle windshield frame, said flange having a bottom portion of increased width provided with a lateral and inwardly directed extension adapted to occupy a position in front of the lower corner of the windshield and the adjacent portion of the windshield frame.

2. A storm shield for motor vehicles comprising a rigid glazed frame having a heighth to extend between the body and the top of the vehicle, a flange outstanding from the forward vertical edge of the frame, means at the rear vertical edge of the frame for attachment of a curtain thereto, and means associated with the flange for attachment thereof to the end of the vehicle windshield frame, said flange having a bottom portion of increased width provided with a lateral and inwardly directed extension adapted to occupy a position in front of the lower corner of the windshield and the adjacent portion of the windshield frame.

In testimony whereof I affix my signature.

WILLIAM B. MICHEL.